(No Model.) 2 Sheets—Sheet 1.
J. CALDWELL & R. T. VINSON.
Cotton Planter.
No. 231,757. Patented Aug. 31, 1880.
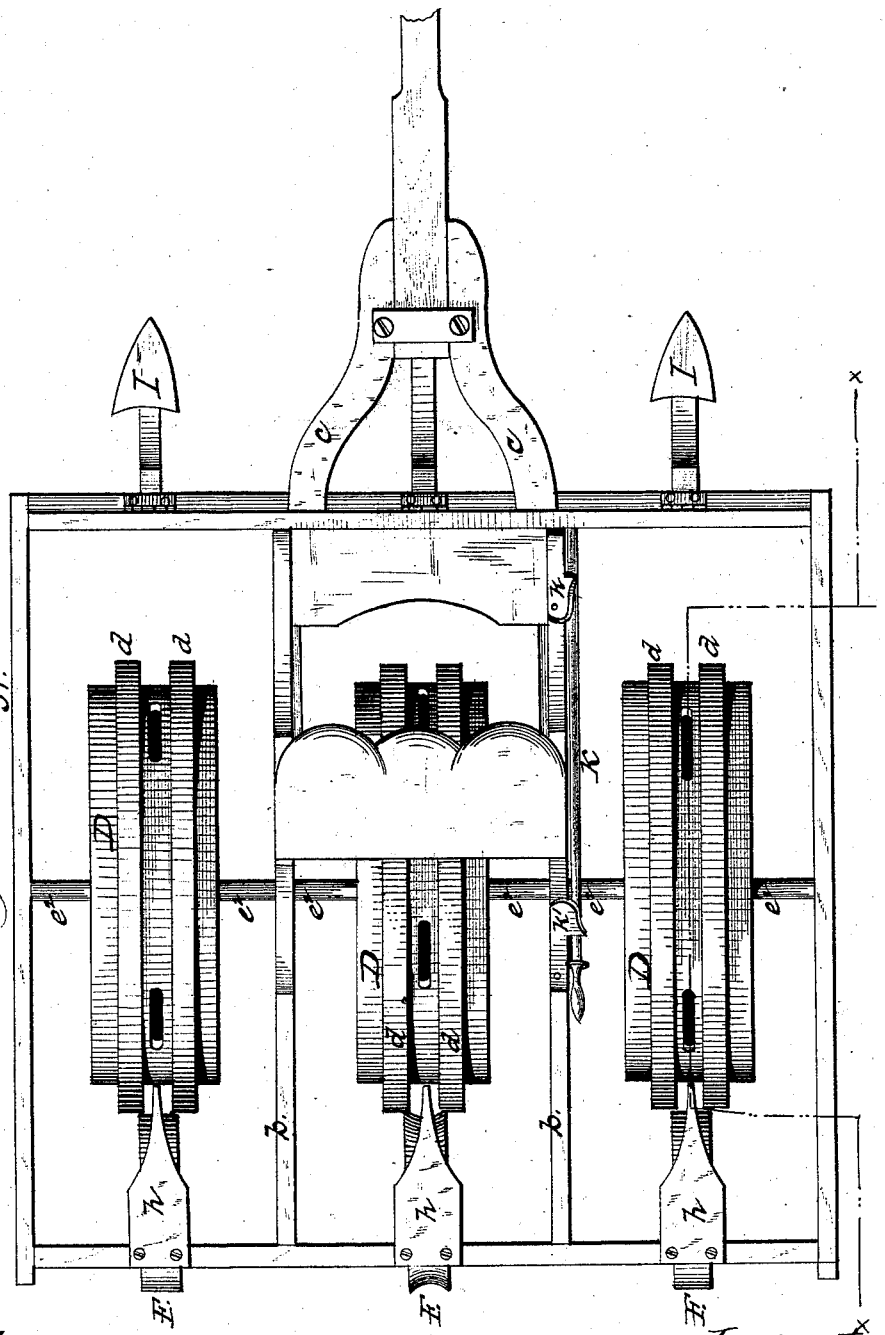

(No Model.) 2 Sheets—Sheet 2.
J. CALDWELL & R. T. VINSON.
Cotton Planter.
No. 231,757. Patented Aug. 31, 1880.
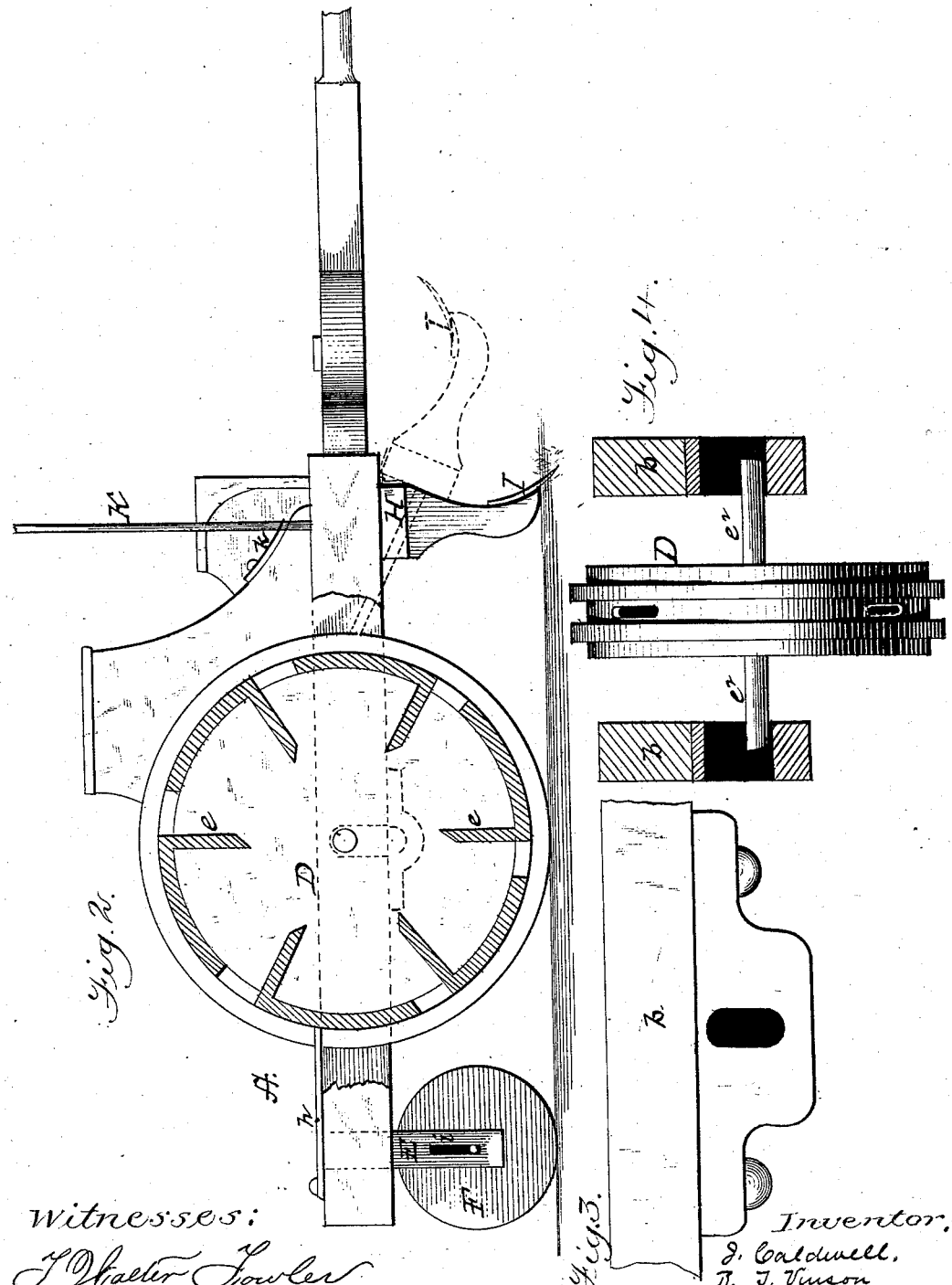

UNITED STATES PATENT OFFICE.

JOHN CALDWELL AND RICHARD T. VINSON, OF SHREVEPORT, LOUISIANA.

COTTON-PLANTER.

SPECIFICATION forming part of Letters Patent No. 231,757, dated August 31, 1880.

Application filed June 21, 1880. (No model.)

*To all whom it may concern:*

Be it known that we, JOHN CALDWELL and R. T. VINSON, citizens of the United States, residing at Shreveport, in the parish of Caddo and State of Louisiana, have invented certain new and useful Improvements in Cotton-Planters; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Our improvements relate to that class of cotton-planters provided with revolving seed-hoppers; and their object is to deposit two or more rows of seed for cotton in furrows prepared by advance plows or furrow-openers and cover the seed in the respective rows by scrapers or their equivalents, by a single machine.

Our improvements consist, first, in arranging in a frame three or more revolving seed-hoppers on independent axles, whereby the hoppers are permitted to act independently of each other; second, in attaching two or more plows to a common bar arranged in advance of the hoppers, and capable of being swung up or down from or to the ground, in combination with two or more seed-drums rolling on the ground and capable of an automatic vertical adjustment in the frame; and, third, in the combination of parts, as will be hereinafter more fully set forth, and specifically claimed.

Figure 1 is a plan view of my improved cotton-seed planter. Fig. 2 is a vertical sectional view taken through the line $x\ x$ of Fig. 1. Figs. 3 and 4 are detail views.

The letter A represents the frame, divided in the present instance into three sections by the longitudinal bars $b\ b$, and upon the bars is erected the driver's seat. To the front bar of the frame A are attached the hounds $c\ c$, to receive a tongue.

The letters D indicate the revolving seed-hoppers or seed-dropping drums arranged in the frame. Each revolving seed-drum is made hollow and provided with a door on one of the sides, suitably fastened or hinged for the passage of the seed to the interior the same, and is also formed with the usual central discharge-space in the periphery of the drum, with the narrow conforming furrow-flanges $d\ d$ arranged on opposite sides of the discharge-space. The interior of each seed-hopper or drum is provided with a series of slotted lifting-shelves, $e$, arranged tangentially around the inner circumference of the hopper in such a manner that they shall come directly opposite the discharge-space of the hopper. The discharge space or openings in the seed hoppers or drums should be so shaped and constructed as to permit the seed to fall out freely and not be clogged by the same. The object of these slotted lifting-shelves arranged within the seed-hoppers is to stir up and feed the seed to the discharge-space, so that the same may be readily deposited in the furrows.

Other well-known mechanical means may be employed for stirring the seed and discharging the same from the hoppers.

Secured firmly to the sides of the hoppers or drums are journals or axles $e^2$, which turn with them, or shafts may pass entirely through the drums. These revolving hoppers or drums are suitably journaled to the frame and cross-bars in their respective sections, so that they may revolve freely and independently of each other upon the ground by frictional contact and properly discharge the seed.

In the accompanying drawings we have shown the central revolving hopper or drum in slotted bearings, so as to be capable of automatic vertical movement in the section caused by the unevenness of the soil.

All the hoppers may be so arranged and adjusted within the frame as to be capable of this automatic vertical movement conforming to the surface of the soil.

It will be noticed by reference to Fig. 4 of the drawings that the journal-bearings or journal-boxes of the dividing or intermediate cross-bars $b$ are of a proper or sufficient width to admit of and support two ends of the axles of the adjacent seed-drums.

To the upper surface of the rear bar of the frame are securely attached the clearers $h$, the front ends of which work between the flanges $d\ d$ of the revolving hoppers, to prevent the discharge-openings from being clogged by the earth. Also, to the rear end of the frame, immediately in rear of the revolving seed-drums, are rigidly secured a series of pendent arms, E, slotted at their lower ends at $i$ to receive the axis of the revolving coverers F. These coverers are likewise capable of an automatic vertical movement, so that they will conform to the unevenness of the soil-surface, and should not extend so low as the bottom of the drums, because they are to cover the furrows and act on the ridges.

In lieu of the revolving coverers, scrapers or their equivalents may be employed to accomplish the same result.

To the forward portion of the frame is hinged or otherwise attached the transverse bar H, and to the under surface of this bar are firmly secured a number of plows or furrow-openers, I, arranged in a line with the respective revolving hoppers. To the upper surface of this bar H is attached a lever, K, in such a manner as to project in front of the driver's seat, and is held in a locked position to maintain the plows or furrow-openers to duty by means of a catch or locking device, $k$, attached to the upper surface of the bar on the right side of the driver's seat. After planting and moving the machine from the field the lever is thrown back, raising the plows from the ground and holding them in a locked position by means of the catch or locking device $k'$ located in rear of the driver's seat.

It will be observed that the seed-hoppers are arranged on independent axles, having their bearings also in independent journal-boxes, to enable each drum to act independently of each other and to conform to any inclination or unevenness of the soil.

The revolving seed hoppers or drums are arranged in the frame in a horizontal line at right angles to the length of the frame and at a distance of about two or three feet between the rows, according to the nature of the soil. Any number exceeding two of these hoppers or drums may be employed.

Operation: The team of horses are harnessed to the machine so that they shall walk between the furrows or rows, and as they advance the furrows for the seed are made by the plows arranged at the forward portion of the machine, the seed dropped from the revolving drum, and the seed covered by the revolving coverers.

By this method of planting cotton a continuous row of seed is deposited in the furrows, and as the plants begin to grow they are trimmed out into blocks by the cultivator.

What we claim as our invention, and desire to secure by Letters Patent, is—

1. In a cotton-planter, three or more revolving seed hoppers or drums having separate axles mounted in a single frame, whereby the seed-hoppers are permitted to act independently of each other, substantially as described.

2. In a cotton-seed planter, two or more plows or furrow-openers attached to a bar common to all, hinged to the frame and capable of being thrown into and out of contact with the soil, in combination with two or more seed-drums rolling on the ground and capable of an automatic vertical adjustment in the frame, substantially as described.

3. The combination of a frame carrying two or more revolving seed hoppers or drums capable of automatic vertical play, two or more plows or furrow-openers, and two or more revolving coverers capable of automatic vertical play, substantially as and for the purpose set forth.

In testimony whereof we affix our signatures in presence of two witnesses.

JOHN CALDWELL.
RICHARD T. VINSON.

Witnesses:
R. J. M. PATTERSON,
W. C. SAMPLE.